United States Patent
Patel et al.

(10) Patent No.: US 10,116,691 B2
(45) Date of Patent: Oct. 30, 2018

(54) VOIP DENIAL-OF-SERVICE PROTECTION MECHANISMS FROM ATTACK

(71) Applicant: KODIAK NETWORKS, INC., San Ramon, CA (US)

(72) Inventors: Krishnakant M. Patel, Richardson, TX (US); Harisha M. Negalaguli, Richardson, TX (US); Arun Velayudhan, Bangalore (IN); Ramu Kandula, Bangalore (IN); Syed N. Khadar, Bangalore (IN); Shiva Cheedella, Plano, TX (US); Subramanyam N. Prashanth, Bangalore (IN)

(73) Assignee: KODIAK NETWORKS, INC., Plano, TX (US)

( * ) Notice: Subject to any disclaimer, the term of this patent is extended or adjusted under 35 U.S.C. 154(b) by 192 days.

(21) Appl. No.: 14/782,494

(22) PCT Filed: May 1, 2014

(86) PCT No.: PCT/US2014/036414
§ 371 (c)(1),
(2) Date: Oct. 5, 2015

(87) PCT Pub. No.: WO2014/179602
PCT Pub. Date: Nov. 6, 2014

(65) Prior Publication Data
US 2016/0050229 A1    Feb. 18, 2016

Related U.S. Application Data

(60) Provisional application No. 61/821,975, filed on May 10, 2013, provisional application No. 61/818,109, filed on May 1, 2013.

(51) Int. Cl.
*G06F 11/00* (2006.01)
*G06F 12/14* (2006.01)
(Continued)

(52) U.S. Cl.
CPC .......... *H04L 63/1458* (2013.01); *H04L 29/06* (2013.01); *H04L 63/1416* (2013.01);
(Continued)

(58) Field of Classification Search
None
See application file for complete search history.

(56) References Cited

U.S. PATENT DOCUMENTS 3,912,874 A    10/1975  Botterell et al.
4,796,293 A     1/1989  Blinken et al.
(Continued)

FOREIGN PATENT DOCUMENTS

GB    2338150 A    3/1998
JP    200392776 A   10/2004
(Continued)

OTHER PUBLICATIONS

International Search Report and Written Opinion dated Sep. 8, 2014 for PCT Application No. PCT/US14/36414.
(Continued)

*Primary Examiner* — Jason K Gee
*Assistant Examiner* — Olanrewaju J Bucknor

(57) ABSTRACT

A system and method for providing advanced voice services in a wireless communications network. The system also interfaces to an Internet Protocol (IP) network to perform the advanced voice services for mobile units in the IP network and includes a protection mechanism against Voice-over-IP (VoiP) Denial-of-Service (DoS) attacks utilizing Advanced Group Services (AGS).

19 Claims, 7 Drawing Sheets

(51) Int. Cl.
*H04L 29/06* (2006.01)
*H04W 4/10* (2009.01)

(52) U.S. Cl.
CPC ...... *H04L 63/1425* (2013.01); *H04L 65/1079* (2013.01); *H04W 4/10* (2013.01)

(56) References Cited

U.S. PATENT DOCUMENTS

| | | | |
|---|---|---|---|
| 5,293,449 A | 3/1994 | Tzeng | |
| 5,353,328 A | 10/1994 | Jokimies | |
| 5,442,809 A | 8/1995 | Diaz et al. | |
| 5,546,449 A | 8/1996 | Hogan et al. | |
| 5,711,011 A | 1/1998 | Urs et al. | |
| 5,752,196 A | 5/1998 | Ahvenainen et al. | |
| 5,987,318 A | 11/1999 | Alperovich et al. | |
| 5,987,331 A | 11/1999 | Grube et al. | |
| 6,011,976 A | 1/2000 | Michaels et al. | |
| 6,021,326 A | 2/2000 | Nguyen | |
| 6,138,011 A | 10/2000 | Sanders, III et al. | |
| 6,141,556 A | 10/2000 | Dougherty et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,473,501 B1 | 10/2002 | Paulsrud | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,725,053 B2 | 4/2004 | Rosen et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,993,355 B1 | 1/2006 | Pershan | |
| 6,996,414 B2 | 2/2006 | Vishwanathan et al. | |
| 7,026,926 B1 | 4/2006 | Walker, III | |
| 7,043,266 B2 | 6/2006 | Chaturvedi et al. | |
| 7,082,316 B2 | 7/2006 | Elden et al. | |
| 7,085,364 B1 | 8/2006 | Ahmed et al. | |
| 7,099,291 B2 | 8/2006 | Harris et al. | |
| 7,123,905 B1 | 10/2006 | Allaway et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,330,540 B2 | 2/2008 | Darby et al. | |
| 7,366,535 B2 | 4/2008 | Glass et al. | |
| 7,403,775 B2 | 7/2008 | Patel et al. | |
| 7,460,861 B2 | 12/2008 | Zabawskj | |
| 7,471,653 B2 * | 12/2008 | McConnell | H04J 3/24 |
| | | | 370/328 |
| 7,529,557 B2 | 5/2009 | Farrill | |
| 7,689,238 B2 | 3/2010 | Biswas et al. | |
| 7,738,861 B2 | 6/2010 | Fournier | |
| 7,738,892 B2 | 6/2010 | Ayyasamy et al. | |
| 7,738,896 B2 | 6/2010 | Patel et al. | |
| 7,751,348 B2 | 7/2010 | Shaffer et al. | |
| 7,764,950 B2 | 7/2010 | Patel et al. | |
| 7,787,896 B2 | 8/2010 | Kundu et al. | |
| 7,797,010 B1 | 9/2010 | Manroa et al. | |
| 7,813,722 B2 | 10/2010 | Patel et al. | |
| 7,853,279 B2 | 12/2010 | Patel et al. | |
| 8,036,692 B2 | 10/2011 | Ayyasamy et al. | |
| 8,244,252 B2 | 8/2012 | Descombes | |
| 8,250,646 B2 | 8/2012 | Zheng | |
| 8,369,829 B2 | 2/2013 | Nagubhai et al. | |
| 8,478,261 B2 | 7/2013 | Vempati et al. | |
| 8,498,660 B2 | 7/2013 | Lawler et al. | |
| 8,599,747 B1 * | 12/2013 | Saleem | H04L 65/605 |
| | | | 370/235 |
| 8,670,760 B2 | 3/2014 | Lawler et al. | |
| 8,676,189 B2 | 3/2014 | Lawler et al. | |
| 8,755,831 B2 * | 6/2014 | Brewer | H04W 72/10 |
| | | | 455/450 |
| 9,282,130 B1 | 3/2016 | Goepp | |
| 2001/0005372 A1 | 6/2001 | Cave et al. | |
| 2002/0009990 A1 | 1/2002 | Kleier et al. | |
| 2002/0024943 A1 | 2/2002 | Karaul et al. | |
| 2002/0077136 A1 | 6/2002 | Maggenti et al. | |
| 2002/0086659 A1 | 7/2002 | Lauper | |
| 2002/0086676 A1 | 7/2002 | Hendrey et al. | |
| 2002/0102989 A1 | 8/2002 | Calvert et al. | |
| 2002/0187750 A1 | 12/2002 | Majumdar | |
| 2002/0196781 A1 | 12/2002 | Salovuori | |
| 2003/0009463 A1 | 1/2003 | Gallant | |
| 2003/0016632 A1 | 1/2003 | Refai et al. | |
| 2003/0017836 A1 | 1/2003 | Vishwanathan et al. | |
| 2003/0053434 A1 * | 3/2003 | Chow | H04W 4/10 |
| | | | 370/338 |
| 2003/0078064 A1 | 4/2003 | Chan | |
| 2003/0119540 A1 | 6/2003 | Mathis | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden | |
| 2004/0095954 A1 | 5/2004 | Varney et al. | |
| 2004/0121760 A1 | 6/2004 | Wetman et al. | |
| 2004/0127233 A1 | 7/2004 | Harris et al. | |
| 2004/0152441 A1 | 8/2004 | Wong | |
| 2004/0176100 A1 | 9/2004 | Florkey et al. | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0219941 A1 | 11/2004 | Haaramo et al. | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0119012 A1 | 6/2005 | Merheb et al. | |
| 2005/0132060 A1 | 6/2005 | Mo et al. | |
| 2005/0143135 A1 | 6/2005 | Brems et al. | |
| 2005/0144485 A1 * | 6/2005 | Mousseau | H04L 29/12122 |
| | | | 726/19 |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 * | 10/2005 | Patel | H04W 76/40 |
| | | | 455/432.1 |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0261016 A1 | 11/2005 | Patel et al. | |
| 2006/0003740 A1 | 1/2006 | Munje | |
| 2006/0003751 A1 | 1/2006 | Vo | |
| 2006/0019654 A1 | 1/2006 | Farrill | |
| 2006/0029189 A1 | 2/2006 | Patel et al. | |
| 2006/0030347 A1 * | 2/2006 | Biswaas | H04W 4/10 |
| | | | 455/518 |
| 2006/0056361 A1 | 3/2006 | Jiang et al. | |
| 2006/0067499 A1 | 3/2006 | Oliveira et al. | |
| 2006/0075084 A1 | 4/2006 | Lyon | |
| 2006/0078064 A1 | 4/2006 | Schmidt et al. | |
| 2006/0094455 A1 | 5/2006 | Hannu et al. | |
| 2006/0095575 A1 * | 5/2006 | Sureka | H04L 12/1822 |
| | | | 709/227 |
| 2006/0116150 A1 | 6/2006 | Bhutiani | |
| 2006/0128411 A1 | 6/2006 | Turcanu | |
| 2006/0178138 A1 | 8/2006 | Ostroff et al. | |
| 2006/0189337 A1 | 8/2006 | Farrill et al. | |

(56) References Cited

U.S. PATENT DOCUMENTS

| | | |
|---|---|---|
| 2006/0189340 A1* | 8/2006 | Sung ............... H04W 84/08 455/518 |
| 2006/0198334 A1 | 9/2006 | Civanlar et al. |
| 2006/0229090 A1 | 10/2006 | Ladue |
| 2006/0229093 A1* | 10/2006 | Bhutiani ............... H04W 4/10 455/518 |
| 2006/0234687 A1 | 10/2006 | Patel et al. |
| 2006/0285493 A1 | 12/2006 | Manuja et al. |
| 2007/0037562 A1 | 2/2007 | Smith-Kerker et al. |
| 2007/0037597 A1 | 2/2007 | Biswas et al. |
| 2007/0037598 A1* | 2/2007 | Ayyasamy ............... H04W 4/00 455/518 |
| 2007/0049314 A1 | 3/2007 | Balachandran et al. |
| 2007/0070976 A1 | 3/2007 | Mussman et al. |
| 2007/0094409 A1 | 4/2007 | Crockett et al. |
| 2007/0099609 A1 | 5/2007 | Cai |
| 2007/0133478 A1 | 6/2007 | Armbruster et al. |
| 2007/0133757 A1 | 6/2007 | Girouard et al. |
| 2007/0154005 A1 | 7/2007 | Daigle |
| 2007/0177602 A1 | 8/2007 | Pichelin et al. |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2007/0270104 A1* | 11/2007 | Allen ............... H04W 76/005 455/78 |
| 2008/0043690 A1* | 2/2008 | Chow ............... H04W 4/10 370/338 |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0159128 A1 | 7/2008 | Shaffer et al. |
| 2008/0299953 A1 | 12/2008 | Rao |
| 2009/0007220 A1 | 1/2009 | Ormazabal et al. |
| 2009/0028146 A1* | 1/2009 | Kleyman ......... H04L 29/06027 370/389 |
| 2009/0080356 A1 | 3/2009 | Song et al. |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0279512 A1 | 11/2009 | Fujishima et al. |
| 2009/0288162 A1 | 11/2009 | Shaffer et al. |
| 2009/0288165 A1 | 11/2009 | Qiu et al. |
| 2009/0325540 A1 | 12/2009 | Yach et al. |
| 2010/0035593 A1 | 2/2010 | Fanco et al. |
| 2010/0132031 A1* | 5/2010 | Zheng ............... H04L 63/0227 726/13 |
| 2010/0142414 A1* | 6/2010 | Patel ............... H04W 4/10 370/277 |
| 2010/0190492 A1 | 7/2010 | Jiang |
| 2010/0197335 A1 | 8/2010 | Jin et al. |
| 2010/0234018 A1 | 9/2010 | Lawler et al. |
| 2010/0304724 A1* | 12/2010 | Lawler ............... H04M 3/42 455/414.1 |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2011/0294494 A1* | 12/2011 | Vempati ............... H04Q 3/0029 455/422.1 |
| 2012/0026947 A1 | 2/2012 | Miller et al. |
| 2012/0090028 A1 | 4/2012 | Lapsley et al. |
| 2012/0266209 A1* | 10/2012 | Gooding ............... H04L 63/20 726/1 |
| 2012/0278496 A1 | 11/2012 | Hsu |
| 2013/0021933 A1 | 1/2013 | Kowali et al. |
| 2013/0021965 A1 | 1/2013 | Chu et al. |
| 2013/0024688 A1* | 1/2013 | Wen ............... H04L 63/0807 713/168 |
| 2013/0138822 A1 | 5/2013 | Hu et al. |
| 2013/0155875 A1 | 6/2013 | Ayyasamy et al. |
| 2013/0196706 A1 | 8/2013 | Patel et al. |
| 2013/0272436 A1 | 10/2013 | Makhlouf et al. |
| 2013/0337859 A1 | 12/2013 | Patel et al. |
| 2014/0078898 A1 | 3/2014 | Anchan et al. |
| 2014/0133443 A1 | 5/2014 | Malladi et al. |
| 2014/0148210 A1 | 5/2014 | Kundu et al. |
| 2015/0078295 A1 | 3/2015 | Mandyam et al. |
| 2015/0085797 A1 | 3/2015 | Ji et al. |
| 2015/0092704 A1 | 4/2015 | Chen |
| 2015/0365961 A1 | 12/2015 | Strasman |
| 2016/0269945 A1 | 9/2016 | Jang |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |
| WO | 2012019508 A1 | 2/2012 |
| WO | 2015105970 A1 | 7/2015 |

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.

Nokia: "What is TETRA? Why Nokia TETRA?", The Nokia TETRA Primer, 2002, pp. 1-29.

Skype: "Skype", Web Archive—SKYPE, May 22, 2004, pp. 1-2, May 22, 2004, pp. 1-2.

Trachwell: "TrackWell Software and Tetra Iceland deliver value added services to Tetra users", Trackwell.com, Oct. 2002, pp. 1-1.

* cited by examiner

VOIP DENIAL-OF-SERVICE PROTECTION MECHANISMS FROM ATTACK

CROSS REFERENCE TO RELATED APPLICATIONS

This application claims the benefit under 35 U.S.C. Section 119(e) of the following co-pending and commonly-assigned patent applications:

U.S. Provisional Application Ser. No. 61/818,109, filed May 1, 2013, by Harisha M. Negalaguli, Krishnakant M. Patel, Arun Velayudhan, Ramu Kandula, Syed N. Khadar, and Subramanyam N. Prashanth, entitled "VOICE-OVER-IP (VOIP) DENIAL OF SERVICE (DOS) PROTECTION MECHANISMS,"; and U.S. Provisional Application Ser. No. 61/821,975, filed May 10, 2013, by Krishnakant M. Patel, Harisha M. Negalaguli, Arun Velayudhan, and Ramu Kandula, entitled "PROTECTION MECHANISMS FROM ATTACKS,"; and which applications are incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. No. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS,", which application claims the benefit under 35 U.S.C. Section 365 of P.C.T. International Application Serial Number PCT/US04/23038, which application claims the benefit under 35 U.S.C. Section 119(e) of U.S. Provisional Application Ser. No. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS,", now U.S. Pat. No. 7,738,892, issued Jun. 15, 2010, which application claims the benefit under 35 U.S.C. Section 119(e) of U.S. Provisional Application Ser. No. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS,", now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK,", now U.S. Pat. No. 7,764,950, issued Jul. 27, 2010, which application claims the benefit under 35 U.S.C. Section 119(e) of U.S. Provisional Application Ser. No. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS,", now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS,", now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS,", which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS,", now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE,", which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS,". now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM,", now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS,", which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM,", now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS,", which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK,", which application claims the benefit under 35 U.S.C. Section 119(e) of U.S. Provisional Application Ser. No. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION,", now U.S. Pat. No. 8,676,189, issued Mar. 18, 2014, which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS,", which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION,", now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK,", now U.S. Pat. No. 8,498,660, issued Jul. 30, 2013, which application claims the benefit under 35 U.S.C. Section 119(e) of U.S. Provisional Application Ser. No. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK,", which application claims the benefit under 35 U.S.C. Section 119(e) of U.S. Provisional Application Ser. No. 61/266,896;

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK,", now U.S. Pat. No. 8,369,829, issued Feb. 5, 2013, which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS,", now U.S. Pat. No. 8,478,261, issued Jul. 2, 2013, which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (PoC) CALL SETUP OPTIMIZATIONS,";

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),", which application claims the benefit under 35 U.S.C. Section 119(e) of U.S. Provisional Application Ser. No. 61/570,694, filed Dec. 14, 2011, by Ravi Ayyasamy, Gorachand Kundu, Krishnakant M. Patel, Brahmananda R. Vempati, Harisha Mahabaleshwara Negalaguli, Shiva Koteshwara Kiran Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),";

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS,", which application claims the benefit under 35 U.S.C. Section 119(e) of U.S. Provisional Application Ser. No. 61/659,292, filed Jun. 13, 2012, by Krishnakant M. Patel, Brahmananda R. Vempati, Anand Narayanan, and Gregory J. Morton, entitled "PUSH-TO-TALK CASE OR SLEEVE FOR CONVERTING GENERIC DEVICES TO FUNCTION LIKE PURPOSE-BUILT PUSH-TO-TALK DEVICES,"; U.S. Provisional Application Ser. No. 61/682,524, filed Aug. 13, 2012, by Krishnakant M. Patel, Brahmananda R. Vempati, Anand Narayanan, and Gregory J. Morton, entitled "RUGGEDIZED PUSH-TO-TALK (PTT) CASE,"; and U.S. Provisional Application Ser. No. 61/705,748, filed Sep. 26, 2012, by Krishnakant M. Patel, Brahmananda R. Vempati, Anand Narayanan, Gregory J. Morton, and Ravi Ayyasamy, entitled "PUSH-TO-TALK CASE OR SLEEVE FOR CONVERTING GENERIC DEVICES TO FUNCTION LIKE PURPOSE-BUILT PUSH-TO-TALK DEVICES,"; and U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC),", which application claims the benefit under 35 U.S.C. Section 119(e) of U.S. Provisional Application Ser. No. 61/593,485, filed Feb. 1, 2012, by Krishnakant M. Patel, Harisha Mahabaleshwara Negalaguli, Brahmananda R. Vempati, Shiva Koteshwara Kiran Cheedella, Arun Velayudhan, Raajeev Kuppa, and Gorachand Kundu, entitled "WiFi INTERWORKING SOLUTIONS FOR PUSH-TO-TALK OVER CELLULAR (PoC) IN THE OPEN MOBILE ALLIANCE (OMA) STANDARD,";

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE,", which application claims the benefit under 35 U.S.C. Section 119(e) of U.S. Provisional Application Ser. No. 61/730,856, filed Nov. 28, 2012, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE,";

all of which applications are incorporated by reference herein.

BACKGROUND OF THE INVENTION

1. Field of the Invention

This invention relates in general to advanced voice services in wireless communications networks, and more specifically, to a method and framework to provide protection mechanisms from voice-over-IP (VoIP) denial-of-service (DoS) attacks.

2. Description of Related Art

Advanced voice services (AVS), also known as Advanced Group Services (AGS), such as two-way half-duplex voice calls within a group, also known as Push-to-Talk-over-Cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks and personal communications systems (PCS) networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

Nonetheless, there is a need in the art for improvements to the methods and systems for delivering the advanced voice services, such as PoC, that comply with both existing and emerging wireless packet-based standards and yet provide superior user experiences. Many existing implementations of PoC suffer from an inferior user experience. The present invention satisfies the need for a superior user experience, and also defines procedures for practical implementation of PoC in commercial, standards-based, cellular networks.

SUMMARY OF THE INVENTION

To overcome the limitations in the prior art described above, and to overcome other limitations that will become apparent upon reading and understanding the present specification, the present invention discloses a system and method for providing advanced voice services in one or more wireless communications networks, and more specifically, to a method and framework to provide protection mechanisms from voice-over-IP (VoIP) denial-of-service (DoS) attacks.

The system and method includes one or more servers that interface to the wireless communications networks to perform advanced voice services for one or more mobile units in the wireless communications networks, wherein the advanced voice services include an instant two-way half-duplex voice call within a group of the mobile units comprising a Push-to-Talk-over-Cellular (PoC) call session. Both the servers and the mobile units that use the advanced group services communicate with each other using control messages within the wireless communications networks, and at least one of the servers switches voice messages for the advanced group services between the mobile units across the wireless communications networks. At least one of the servers manages the PoC call session by acting as an arbitrator for the PoC call session and controls the sending of the control messages and the voice messages to and from the mobile units. Moreover, at least one of the servers interfaces to an Internet Protocol (IP) network to perform the advanced voice services for the mobile units in the IP network and includes a protection mechanism against denial-of-service (DoS) attacks that may disrupt the system.

The protection mechanism comprises a Deep Packet Inspection/Access List Controller (DPI/ACL) function that restricts traffic to trusted and valid sources in the IP network. The protection mechanism allows the mobile units operating in the IP network that is an untrusted IP network to access the system, but prevents unauthorized sources operating in the untrusted IP network from accessing the system. The protection mechanism identifies and black-lists sources in the IP network that attempt the DoS attacks; the protection mechanism also identifies and white-lists the mobile units in the IP network that are known to be valid users of the system.

In one embodiment, the protection mechanism compares an incoming message to a white-list that identifies known good addresses, such that the incoming message that is successfully compared to the white-list is then compared by the protection mechanism to a black-list that identifies known bad addresses, such that the incoming message that is successfully compared to the black-list is then forwarded to at least one of the servers, and the incoming message that is not successfully compared to the white-list and the black-list is then discarded.

Any or all of the servers having knowledge of traffic patterns resulting from their functions may make updates to the white-list or black-list. For example, a server may detect suspect traffic patterns and update the black-list with a source in the IP network of the suspect traffic patterns, wherein the source resides on the black-list for a configured time period. In another example, once an authentication of a mobile unit is successful, the white-list is updated to include the mobile unit's address. On the other hand, a source in the IP network receiving a configured number of authentication challenges within a configured time period from at least one of the servers is added to the black-list.

In another embodiment, the protection mechanism, on receiving a User Datagram Protocol (UDP) packet from a source in the IP network, checks whether the source's address is present in the black-list; if so, then the UDP packet is discarded; otherwise, if the source's address is not present in the black-list, then an entry for the source's address is added in a table with a value and a watch period is set; if an entry for the source's address already exists in the table, then the value for the entry is incremented, and if the value exceeds a configured threshold within the watch period, then the source's address is added to the black-list.

In still another embodiment, the protection mechanism, on receiving a Session Initiation Protocol (SIP) message from a source in the IP network, checks whether the source's address is present in the black-list; if so, then the SIP message is discarded; otherwise, if the source's address is not present in the black-list and the SIP message is a SIP REGISTER message, then an entry for the source's address is added in a table with a value and a watch period is set; if an entry for the source's address already exists in the table, then the value for the entry is incremented, and if the value exceeds a configured threshold within the watch period, then the source's address is added to the black-list.

In yet another embodiment, the protection mechanism, prior to transmitting a response from one of the servers to a source in the IP network, checks whether the response is an authentication challenge; if so, then an entry for the source's address is added in a table with a value and a watch period is set; if an entry for the source's address already exists in the table, then the value for the entry is incremented, and if the value exceeds a configured threshold within the watch period, then the source's address is added to the black-list; otherwise, if the response is not an authentication challenge, then if an entry for the source's address already exists in the table, then the value for that entry is reset.

In still yet another embodiment, when a mobile unit initiates a session, a unique signature token is generated and inserted into a response, such that the mobile unit sends the unique signature token in all subsequent messages, and the protection mechanism discards any messages purportedly from the mobile unit without the unique signature token.

BRIEF DESCRIPTION OF THE DRAWINGS

Referring now to the drawings in which like reference numbers represent corresponding parts throughout.

DETAILED DESCRIPTION OF THE INVENTION

Figure 1:
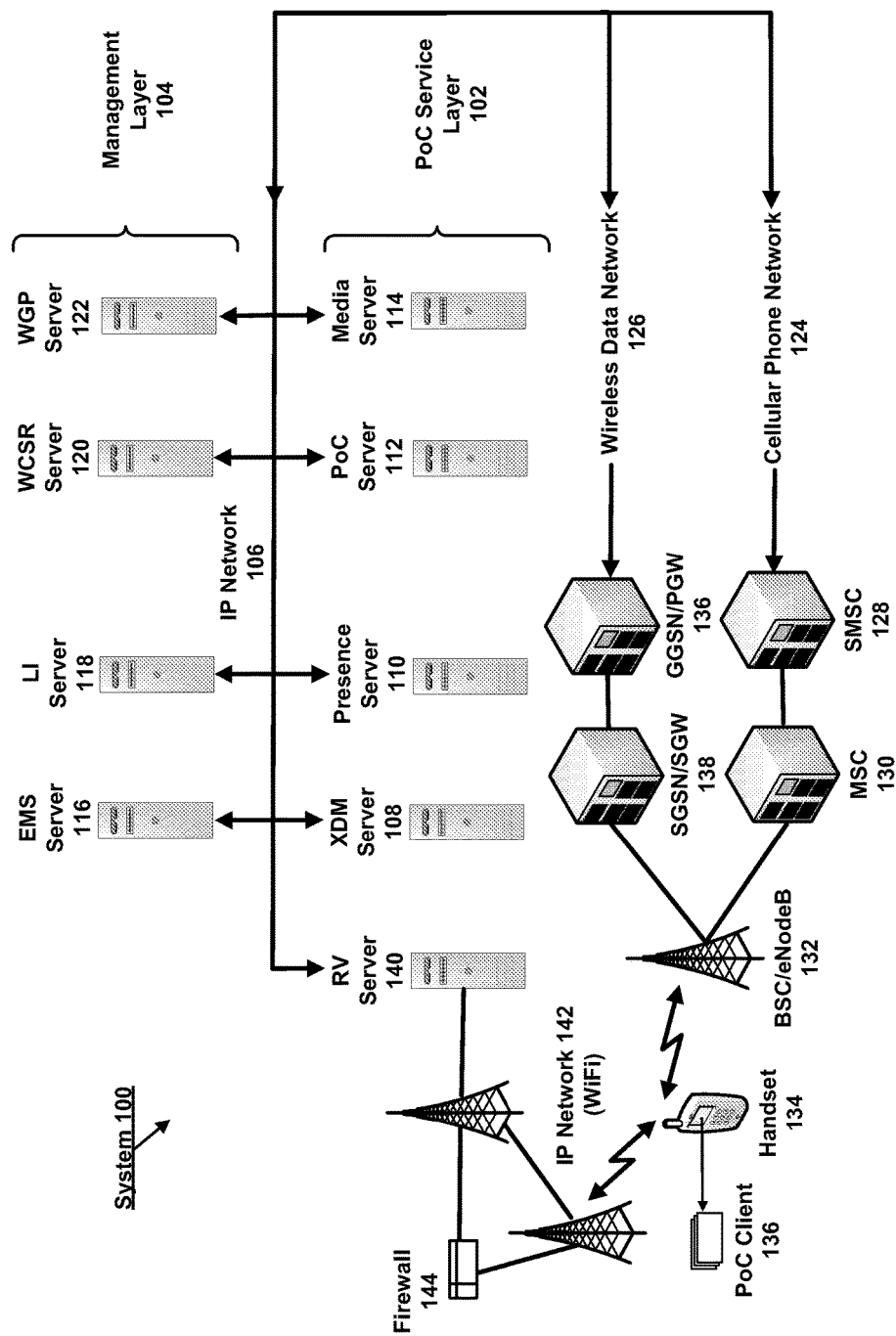
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
|---|---|
| ATCA | Advanced Telecommunications Computing Architecture |
| DnD | Do not Disturb |
| DNS | Domain Name Server |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTF | Realtime Transport Protocol |
| SDP | Session Description Protocol |
| SIM | Subscriber Identity Module |
| SIP | Session Initiation Protocol |
| SMMP | Short Message peer-to-peer Protocol |
| SMS | Small Message Service |
| SSL | Secure Sockets Layer protocol |
| SSRC | Synchronization SouRCe |
| TLS | Transport layer security protocol |
| UDP | User Datagram Protocol |
| URI | Uniform Resource Identifier |
| VoIP | Voice-over-IP |
| SGW | Serving GateWay |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
|---|---|
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signalling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |

-continued

| Term | Description |
|---|---|
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 (also referred to as a mobile unit, mobile station, mobile phone, cellular phone, etc.) executing a PoC Client 136. The wireless data network 126, depending on its type, e.g., GPRS or 4G/LTE, includes one or more Gateway GPRS Support Nodes (GGSNs) or Packet Gateways (PGWs) 136 and Serving GPRS Support Nodes (SGSNs) or Serving GateWays (SGWs) 138, which also communicate with customer handsets 134 via BSCs or eNodeBs 132.

Finally, in one embodiment of the present invention, the PoC Service Layer 102 and Management Layer 104 are connected to one or more RendeVous (RV) Servers 140, which are coupled to one or more external IP networks 142, such as WiFi networks 142, possibly using one or more Firewalls 144, in order to communicate with one or more PoC Clients 136 on one or more handsets 134. Traffic to and from the wireless data networks 126 also traverses the RV Servers 140.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 136 transfers IP packets between the PoC Client 136 and the various servers:
  SIP/IP signaling messages between the PoC Server 112 and PoC Client 136 for control traffic exchange (i.e., control packets) for PoC call sessions.
  RTP/IP, RTCP/IP and MBCP/IP packets between the Media Server 114 and PoC Client 136 for bearer traffic exchange (i.e., voice packets) for PoC call sessions.
  SIP/IP signaling messages between the Presence Server 110 and PoC Client 136 for presence information.
  XCAP/HTTP/IP and SIP/IP signaling between the XDM Server 108 and PoC Client 136 for document management.

The SMSC 128 handles authentication:
  The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the WiFi network 142:

The RV Server 140 transfers IP packets between the PoC Client 136 and the various servers:

SIP/IP signaling messages between the PoC Server 112 and PoC Client 136 for control traffic exchange (i.e., control packets) for PoC call sessions.

RTP/IP, RTCP/IP and MBCP/IP packets between the Media Server 114 and PoC Client 136 for bearer traffic exchange (i.e., voice packets) for PoC call sessions.

SIP/IP signaling messages between the Presence Server 110 and PoC Client 136 for presence information.

XCAP/HTTP/IP and SIP/IP signaling between the XDM Server 108 and PoC Client 136 for document management.

SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:

PoC Server 112,
Media Server 114,
Presence Server 110,
XDM Server 108, and
RV Server 140.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 RV Server

The RV Server 140 implements a interworking solution for the PoC Service to communicate via one or more IP network 142 access points to the PoC Clients 136. Specifically, the RV Server 140 provides PoC Service over an IP network 142 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 142. The RV Server 140 also resolves security concerns that arise with such interworking solutions.

This is necessary because the quality, performance and availability of the wireless data networks 126 typically vary from location to location based on various factors. In addressing these issues, the interworking solution implemented by the RV Server 140 provides following benefits:

PoC Services becomes available even in those locations where a wireless data network 126 is not available, but where a general purpose IP network 142 is available. This is particularly more useful in enhancing in-building coverage for the PoC Service.

By connecting over the IP network 142, the available IP bandwidth, quality and performance can be more streamlined and controlled since the IP network 142 (typically) has a greater capacity and throughput as compared to the wireless data network 126, which is more shared in nature.

By utilizing the greater available bandwidth over the IP network 142, as compared to the wireless data network 126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:

Element Management System (EMS) Server 116,
Lawful Intercept (LI) Server 118,
Web Group Provisioning (WGP) Server 122, and
Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer

3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.4 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains a separate subscription for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.5 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.6 RV Server

The RV Server 140 performs interworking for the PoC service by communicating with the PoC Clients 136 via one or more IP networks 142 and/or wireless data networks 126.

The PoC Client 136 sets up one or more connections using the configured Fully Qualified Domain Name (FQDN), or absolute domain name, of the RV Server 140, which may be publicly exposed to the Internet. Secure transport protocols may (or may not) be used for the connections across the IP networks 142 and/or wireless data networks 126. For example, the PoC Clients 136 may use the Transport Layer Security (TLS) and/or Secure Sockets Layer (SSL) protocols for encrypting information transmitted over the connections between the PoC Client 136 and the RV Server 140.

In such an embodiment, all SIP signaling and voice data (RTP and RTCP) would be tunneled over the SSL/TLS connections between the PoC Client 136 and the RV Server 140. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the RV Server 140 performs as an encryption/decryption off-loader that provides end-to-end encryption for all traffic transmitted to and from the PoC Client 136. Specifically, all of the traffic sent to the PoC Client 136 is encrypted at the RV Server 140 and all the traffic received from the PoC Client 136 is decrypted at the RV Server 140.

The RV Server 140 terminates the SSL/TLS connections and aggregates or dis-aggregates the PoC Client 136 traffic to the appropriate Servers 108, 110, 112, 114, 116, 118, 120 and 122. Specifically, the RV Server 140 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the RV Server 140 is a single point-of-contact for all traffic to and from the PoC Clients 136 at an IP transport layer via the IP networks 142 and/or wireless data networks 126.

Typically, the SSL/TLS connections are persisted and used for any bidirectional data transfer between the RV Server 140, or other Servers, and the PoC Clients 136. Thus, a PoC Client 136 maintains an "always-on" connection with the RV Server 140 by periodically sending "keep-alive" messages over the SSL/TLS connections.

The system also simplifies the traversal of the Firewalls 144. Preferably, the PoC Clients 136 establish the SSL/TLS connections to the RV Server 140 over TCP port 443, which is typically used for HTTPS communications. This allows for Firewall 144 traversal on most corporate networks, because the Firewall 144 facing (exposed to) the Internet is default configured to allow (and not deny) the SSL/TLS connections on TCP port 443. As a result, the system does not require that any special changes be made to the Firewall 144, such as those changes typically required for VoIP deployments in corporate networks. Instead, the traffic with the PoC Clients 136 is routed over SSL/TLS connections on TCP port 443, which can traverse through the Firewalls 144 seamlessly.

3.2 Management Layer
3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

Create Subscriber account,
Update Subscriber account,
Delete Subscriber account,
Mobile number change command,
Forced synchronization of a Subscriber,
Deactivate a Subscriber account,
Reactivate a Subscriber account,
View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

group management,
contact management, and
associations between corporations.

With regard to group management, the CAT of the WGP Server 122 includes the following operations:

Create, Update, Delete and View Corporate Groups,
Add, Update, Delete and View Members of a Corporate Group,
Manage Subscribers,
Activate and Deactivate a Corporate Subscriber,
Change a Subscriber type from "Corporate" to "Corporate And Public", and vice versa,
Restrict Availability, i.e., do not allow subscriber to change their presence status, and
Manage number porting or name change via phone assignment.

With regard to contact management, the CAT of the WGP Server 122 includes the following operations:

Phone list management,
N×N Contact Add (e.g., N contacts may be members of N groups),
Add, Update, Delete and View Contacts for a specific subscriber, and
Export and Import contacts at both the subscriber and corporate level.

With regard to associations between corporations, the CAT of the WGP Server 122 includes the following operations:

Corporate Associations Attributes,
Association Name,
Association ID,
Association Mode (e.g., One-way, Two-way), and
Restricted List.

Once the association is created and accepted, corporate administrators can create contacts and groups using the association policies. Administrators from other corporations can view the contacts, and may or may not have the capability to add, update or delete the contacts.

Corporate ID associated per corporate subscriber,
Central management of corporate subscribers, groups, and contacts,
Intercorporate associations, including contacts and white-lists,
Phone list management (e.g., N×N contact add),
Restrict Availability, and
Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:

PoC Calls and Instant Personal Alert,
Presence, and
Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

4 Protection from Attack

4.1 Overview

Figure 2:
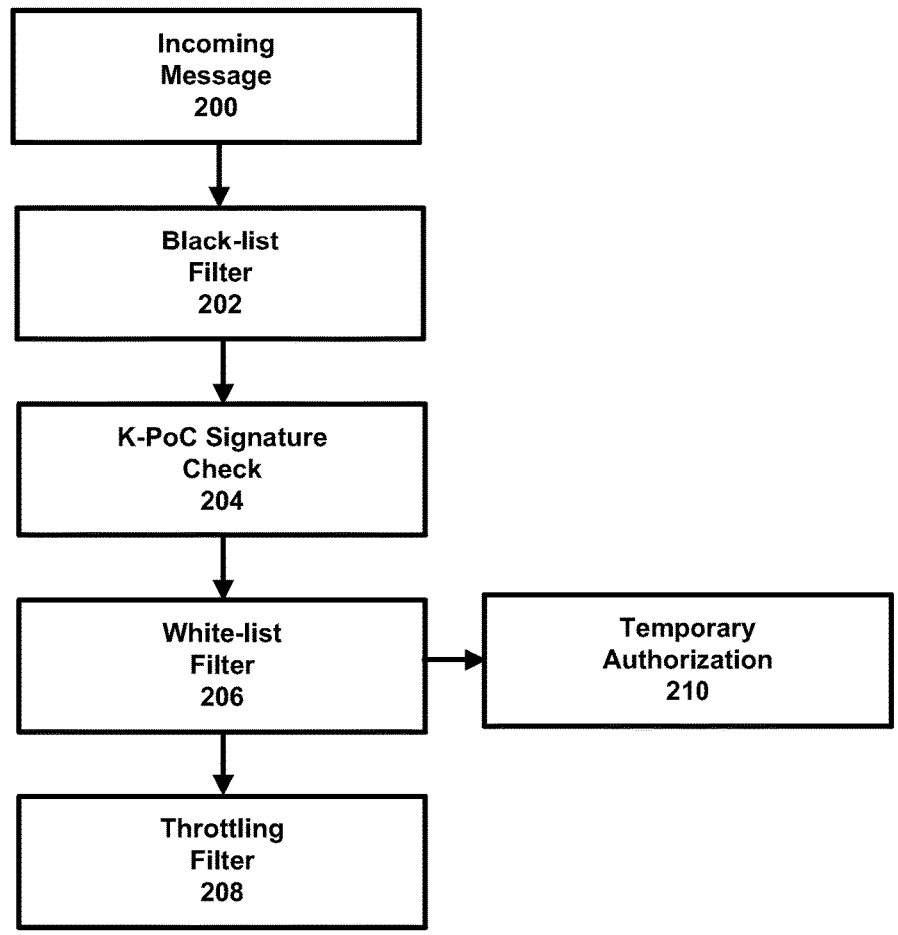
FIG. 2 is a flowchart illustrating the general method of the Voice-over-IP (VoIP) Denial of Service (DoS) Protection Mechanisms provided by one embodiment of the present invention.

FIG. 2 is a flowchart illustrating the general method of the Voice-over-IP (VoIP) Denial of Service (DoS) Protection Mechanisms provided by one embodiment of the present invention.

The motivation for the present invention is to provide a protection mechanism against VoIP DoS attacks that may disrupt the system 100. Specifically, the present invention identifies and black-lists attempts made by individuals or groups in bringing down the system 100 using any form of messaging. To accomplish this, the present invention also identifies and white-lists individuals and groups that are known to be valid users of the system 100.

Attackers can be a single user or from multiple user environments. Attackers also can be within or outside the IP network 106, because the IP network 106 may be open or connected to un-trusted IP networks, such as IP network 142 and/or wireless data networks 126. The problem solved by the present invention is to protect any or all of the servers 108, 110, 112, 114, 116, 118, 120, 140 from unintended, unauthorized and other attacks. Specifically, the present invention protects against VoIP DoS attacks towards any or all of the servers 108, 110, 112, 114, 116, 118, 120, 140.

The specific solution of the present invention looks at all message traffic on the IP network 106, 142 and/or wireless data networks 126. An incoming message 200 is first compared to a black-list filter 202 that identifies known "bad" IP addresses. If this comparison is unsuccessful, because the IP address of the sender of the message 200 is not on the black-list 202, then the message 200 undergoes a K-PoC signature check 204 to determine if a unique "service signature token" is included in the message 200. Thereafter, the message 200 is compared to a white-list filter 206 that identifies known "good" IP addresses. If this comparison is successful, because the IP address of the sender of the message 200 is on the white-list 206, then a rate throttling filter 208 may be applied once the message 200 is permitted into the IP network 106, 142 and/or wireless data networks 126. If this comparison is unsuccessful, because the IP address of the sender of the message 200 is not on the white-list 206, then a temporary authorization 210 may be made to allow limited number of such messages 200, so as to complete a possible authentication with any or all of the servers 108, 110, 112, 114, 116, 118, 120, 140.

With regard to the white-list filter 206, good IP addresses may comprise a combination of IP and port addresses or just IP address itself. Similarly, with regard to the black-list filter 202, bad IP addresses may comprise a combination of IP and port addresses or just IP address itself.

Any or all of the servers 108, 110, 112, 114, 116, 118, 120, 140 having knowledge of traffic patterns resulting from their functions make updates to the white-list 206 or black-list 202. For example, one of the servers 108, 110, 112, 114, 116, 118, 120, 140 may detect suspect traffic patterns and then update the black-list 202 with a source of the suspect traffic patterns in the IP network 106, 142 and/or wireless data networks 126.

4.2 DoS Protection for Signaling

Figure 3:
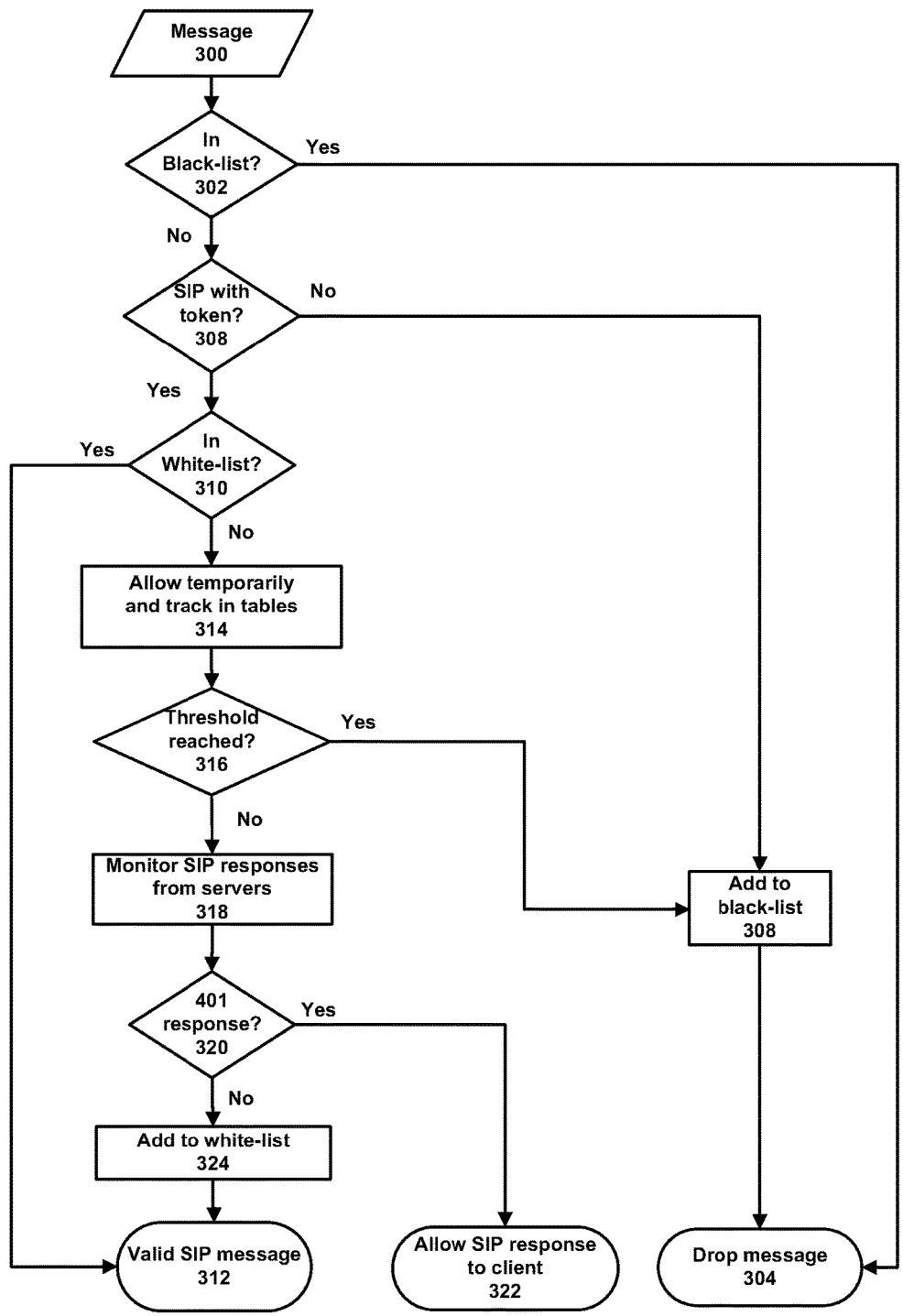
FIG. 3 is a more detailed flowchart illustrating the general method of the Voice-over-IP (VoIP) Denial of Service (DoS) Protection Mechanisms when using a Session Initiation Protocol (SIP) protocol, according to one embodiment of the present invention.

FIG. 3 is a more detailed flowchart illustrating the general method of the Voice-over-IP (VoIP) Denial of Service (DoS) Protection Mechanisms when using the SIP protocol.

The RV Server 140 publishes an IP address and port number for SIP communications from the PoC Clients 136. The RV Server 140 expects only valid SIP traffic on the published IP address and port number. Any DoS attack can be in the form of non-SIP messages or it could be intelligently crafted by an attacker to disguise itself as valid SIP messages. To protect against all these type of attacks, the RV Server 14 implements various mechanisms as explained below.

As shown in FIG. 3, an incoming message 300 is first compared to the black-list filter 202 that identifies known "bad" IP addresses. If the message 300 is black-listed 202, then packets received from this source are dropped at 304 for some configured period of time. On the other hand, if the message 300 is not black-listed, then the message 300 is checked at 306 to determine whether it is a valid SIP message and whether it includes a unique "service signature token" as one of the extension parameters in the SIP header, wherein the service signature token is provided to all valid PoC Clients 136 during a provisioning or activation process. If the message 300 is not a valid SIP message or if the service signature token is not in the SIP header, then the IP:port address of the message 300 is black-listed at 308.

If the message 300 is a valid SIP message and if the service signature token is in the SIP header, then the message 300 is compared to the white-list filter 206 at 310 that identifies known "good" IP addresses, which are already authenticated with the servers 108, 110, 112, 114, 116, 118, 120, 140. If the comparison is successful, then the message 300 is a valid SIP message, the source is accepted as valid, and further SIP messages are allowed from the source, at 312. However, the messages 300 generated by valid sources in the white-list 206 are still subject to throttling and traffic shaping rules that are used to control misbehaving PoC Clients 136 or to control compromised but valid PoC Clients 136 that could potentially be used for DoS attacks on the servers 108, 110, 112, 114, 116, 118, 120, 140.

If the comparison with the white-list 206 is not successful, then the message 300 is subject to a temporary authorization filter at 314, 316, 318, 320 and 322, in which the source is allowed to exchange a limited number of SIP messages, so as to provide an opportunity for PoC Clients 136 to authenticate themselves with the servers 108, 110, 112, 114, 116, 118, 120, 140, and prove themselves to be valid PoC Clients 136.

Once an authentication of a PoC Client 136 is successful, at 320, the white-list 206 may be updated at 324 to include the IP:port address of the PoC Client 136, and thus indicate at 312 that the message 300 is a valid SIP message. On the other hand, at 316, 318, 320 and 322, a source in the IP network 106, 142 and/or wireless data networks 126 receiving a configured number of authentication challenges within a configured time period from at least one of the servers 108, 110, 112, 114, 116, 118, 120, 140 is added to the black-list 202 at 308.

Specifically, any PoC Clients 136 continuously receiving so-called "401" authentication challenges from any of the servers 108, 110, 112, 114, 116, 118, 120, 140 are added to the black-list 202, wherein a 401 authentication challenge is a response generated by a server to an unauthenticated request by a client. Such black-listing may occur when a specific PoC Client 136 receives a configured number of 401 authentication challenges within a configured time period. Moreover, the specific PoC Client 136 may reside on the black-list 202 for a configured time period, and thereafter may be removed from the black-list 202 until such time as it may be black-listed again.

Prior to transmitting any response from a server 108, 110, 112, 114, 116, 118, 120, 140, a check is made whether the response is a 401 authentication challenge; if so, then an entry for the IP:port address of the source is added in a TempAuth_sip_srcs_list_401 ipport table with value of 1 and a watch period of Y1. If an entry for the IP:port address already exists in the TempAuth_sip_srcs_list_401 ipport table, then the value for that entry is incremented, and if the value exceeds a configured threshold within the watch period, then the IP:port address is added to the black-list 202. Otherwise, if the response is not a 401 authentication challenge, then if an entry for the IP:port address already exists in the TempAuth_Sip_srcs_list_401 ipport table, then the value for that entry is set to 0.

With regard to the black-list filter 204, on receiving any UDP packets, a check is made whether the IP:port address of the source is present in the black-list 202; if so, then the UDP is discarded. For a TCP packet, in addition to dropping the packet, the TCP connection from which the TCP packet was received is also disconnected; otherwise, if the IP:port address is not present in the black-list 202, and the SIP message is a particular type of SIP request message (such as a REGISTER, INVITE, SUBSCRIBE, PUBLISH or REFER SIP message), then an entry for the IP:port address is added in a TempAuth_Sip_Srcs_list ipport table with value of 1 and a watch period of Y2. If an entry for the IP:port address already exists in the TempAuth_Sip_Src_list ipport table, then the value for that entry is incremented, and if the value exceeds a configured threshold within the watch period, then the IP:port address is added to the black-list 202.

4.3 DPI/ACL Function

Figure 4:
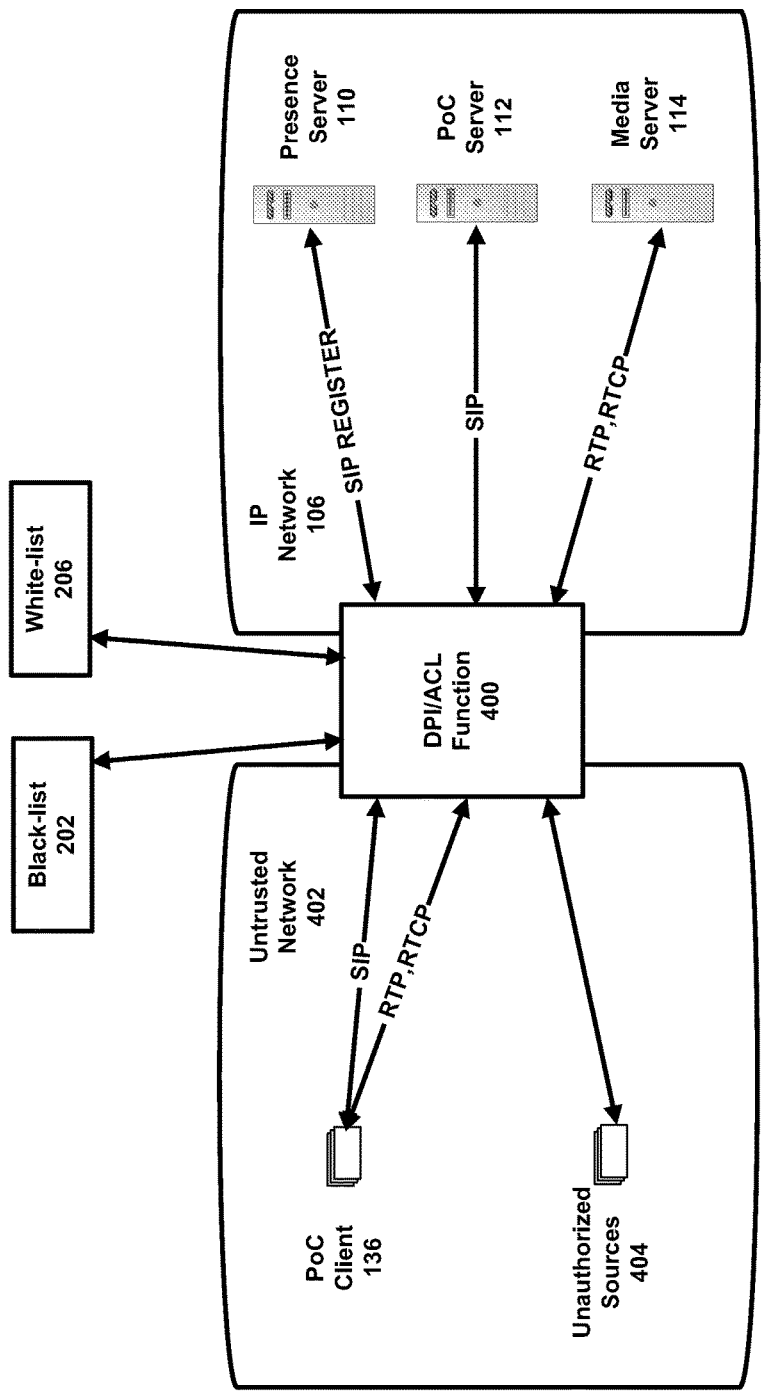
FIG. 4 is a diagram that illustrates how the white-list and black-list are built as protection mechanisms from attacks, according to one embodiment of the present invention.

FIG. 4 is a diagram that illustrates how the white-list 206 and black-list 202 are built as protection mechanisms from attacks according to one embodiment of the present invention.

Specifically, any or all servers exposed to untrusted sources, such as the Presence Server 110, PoC Server 112 and Media Server 114, may implement a Deep Packet Inspection (DPI) and IP-level Access List Controller (ACL) function 400 to restrict traffic to trusted and valid sources in the IP networks 106, 142 and/or wireless data networks 126. Any or all servers, such as the Presence Server 110, PoC Server 112 and Media Server 114, having knowledge of the traffic patterns resulting from its functions, may make updates to the white-list 206 and black-list 202, and may manage the white-list 206 and black-list 202, using the DPI/ACL function 400. The goal of the DPI/ACL function 400 is to allow PoC Clients 136 operating in an untrusted IP network 402, such as the Internet, to access the system 100, but to prevent unauthorized traffic sources 404 operating in the untrusted IP network 402 from accessing the system 100. Legitimate PoC Clients 136 use SIP and RTP/RTCP protocols to communicate with the Presence Server 110, PoC Server 112 and Media Server 114 over the untrusted IP network 402. Unauthorized traffic sources 404, on the other hand, comprise any IP data source that sends unintended IP traffic (of any type, including SIP and RTP/RTCP messages) to the exposed IP addresses of the Presence Server 110, PoC Server 112 and Media Server 114 over the untrusted network 402.

In general, the white-list 206 and black-list 202 are built by the Presence Server 110, PoC Server 112 and Media Server 114, using the DPI/ACL function 400 and the following techniques:

(1) Once SIP REGISTER authentication is successful, the white-list 206 is updated to include the IP:port address of the registered PoC Client 136.

(2) On the other hand, sources with repeated authentication failures are added to the black-list 202.

(3) The Presence Server 110, PoC Server 112 and Media Server 114 detect suspect traffic patterns and update the black-list 202 with the sources of such traffic.

(4) Further, if the DPI/ACL function 400 observes multiple port numbers of the same IP address being black-listed, then all messages from that source are black listed, regardless of the port or transport type (TCP or UDP).

More specifically, the white-list 206 and black-list 202 may be built by the Presence Server 110, PoC Server 112 and Media Server 114, using the DPI/ACL function 400 and the following methods.

A first method involves restricting SIP traffic from valid PoC Clients 136. When a valid PoC Client 136 registers, the SIP Registrar function of the Presence Server 110 inserts the IP:port address of the PoC Client 136 (as identified from UDP headers) into the white-list 206 and into the DPI/ACL function 400. Each entry in the white-list 206 has at least following information:

IP:port address (source IP, UDP or TCP port numbers—port numbers can be wildcarded), Expiry time (which will match the "expires" header returned), and Protocol: SIP or Any type The DPI/ACL function 400 allows for a SIP REGISTER message to be received for some pre-configured limit (e.g., one time) from PoC Clients 136, so as to enable authentication by the SIP Registrar function. Further, the DPI/ACL function 400 monitors for authentication failures (i.e., if a SIP REGISTER response comprises a 401 authentication request), then the PoC Clients 136 are added to the black-list 202. The DPI/ACL function 400 also allows SIP traffic only from IP:port addresses on the white-list 206. In other words, traffic from any un-authenticated traffic sources 404 is blocked by the DPI/ACL function 400.

A second method involves the Presence Server 110, PoC Server 112 and Media Server 114 identifying suspect attack patterns and adding the PoC Clients 136 or unauthorized sources 404 generating those suspect attack patterns to the black-list 202. The Presence Server 110, PoC Server 112 and Media Server 114 detect the abnormal or malformed traffic patterns and report the PoC Client 136 or unauthorized sources 404 to the DPI/ACL function 400 in order to update the black-list 202. For example, the PoC Server 112 may detect abnormal SIP traffic from a PoC Client 136 (which could signal a compromised PoC Client 136). In another example, the Media Server 114 may receive RTP or RTCP traffic without a valid synchronization source (SSRC) or pre-established session (PES) ID. Once notified, the DPI/ACL function 400 blocks all traffic from IP addresses on the black-list 202.

4.4 DoS Protection for PoC Media Traffic (RTP/RTCP)

Figure 5:
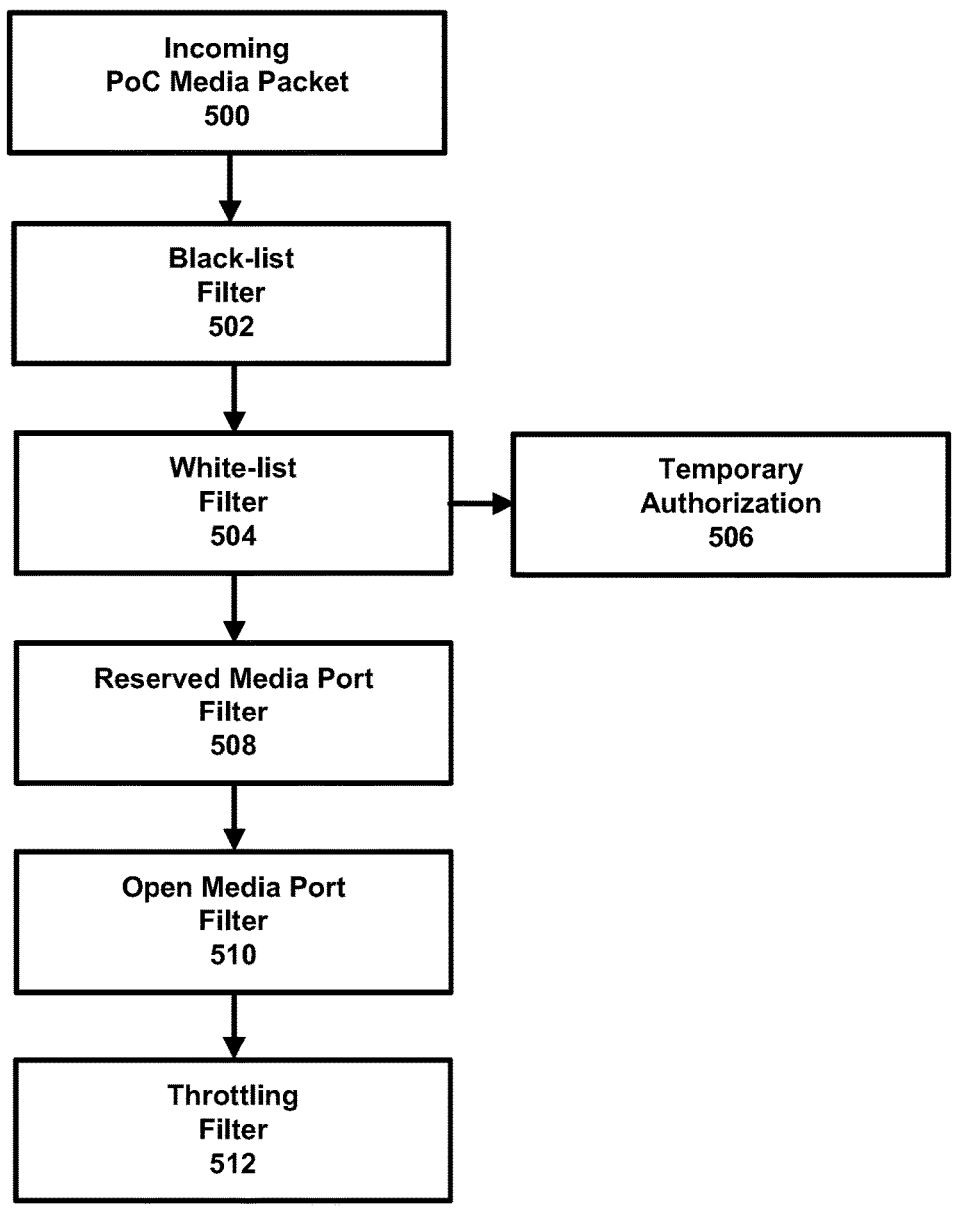
FIG. 5 is a diagram that illustrates how reserved and open media port filters are built as protection mechanisms from attacks for media traffic in addition to media white-list and black-list filter mechanisms, according to one embodiment of the present invention.

FIG. 5 is a diagram that illustrates how reserved and open media port filters are built as protection mechanisms from attacks for media traffic in addition to media white-list and black-list filter mechanisms according to one embodiment of the present invention.

Specifically, the Media Server 114, which is exposed to untrusted sources, may implement the DPI/ACL function 400 to restrict traffic comprised of incoming PoC media packets 500 to trusted and valid sources in the IP networks 106, 142 and/or wireless data networks 126. The Media Server 114 updates and manages a media black-list 502 and media white-list 504 using the DPI/ACL function 400. The goal of the DPI/ACL function 400 is to allow PoC Clients 136 operating in an untrusted IP network 402, such as the Internet, to access the system 100, but to prevent unauthorized traffic sources 404 operating in the untrusted IP network 402 from accessing the system 100. Legitimate PoC Clients 136 use RTP/RTCP protocols to communicate with the Media Server 114 over the untrusted IP network 402. Unauthorized traffic sources 404, on the other hand, comprise any IP data source that sends unintended IP traffic (of any type, including SIP and RTP/RTCP messages) to the exposed IP addresses of the Media Server 114 over the untrusted network 402.

In general, the media black-list 502 and media white-list 504 are built by the Media Server 114 using the DPI/ACL function 400 and the following techniques:

(1) Once media session authentication is successful, the media white-list 504 is updated to include the RTP and RTCP IP:port address of the registered PoC Client 136.

(2) On the other hand, sources with repeated authentication failures are added to the media black-list 502.

(3) The Media Server 114 detects suspect traffic patterns and updates the media black-list 502 with the sources of such traffic.

More specifically, the media black-list 502 and media white-list 504 may be built by the Media Server 114, using the DPI/ACL function 400 and the following methods.

If the IP packet received on media IP interface of the RV Server 140 that does not successfully complete the media white-list 504 comparison is subject to a temporary authorization filter 506, in which the source is allowed to exchange media packets in very limited rate, so as to provide opportunity for PoC Clients 136 to authenticate themselves with a server and prove to be valid PoC Client 136. If authenticated, valid PoC Clients 136 are added to the media white-list 504.

Thereafter, valid PoC Clients 136 are added to a reserved media port filter 508 or an open media port filter 510, which are described in more detail below. Further, a rate throttling filter 512 may be applied once the PoC media packet 500 is permitted into the IP network 106, 142 and/or wireless data networks 126.

4.5 Restricting Media Traffic from Valid PoC Clients

Figure 6:
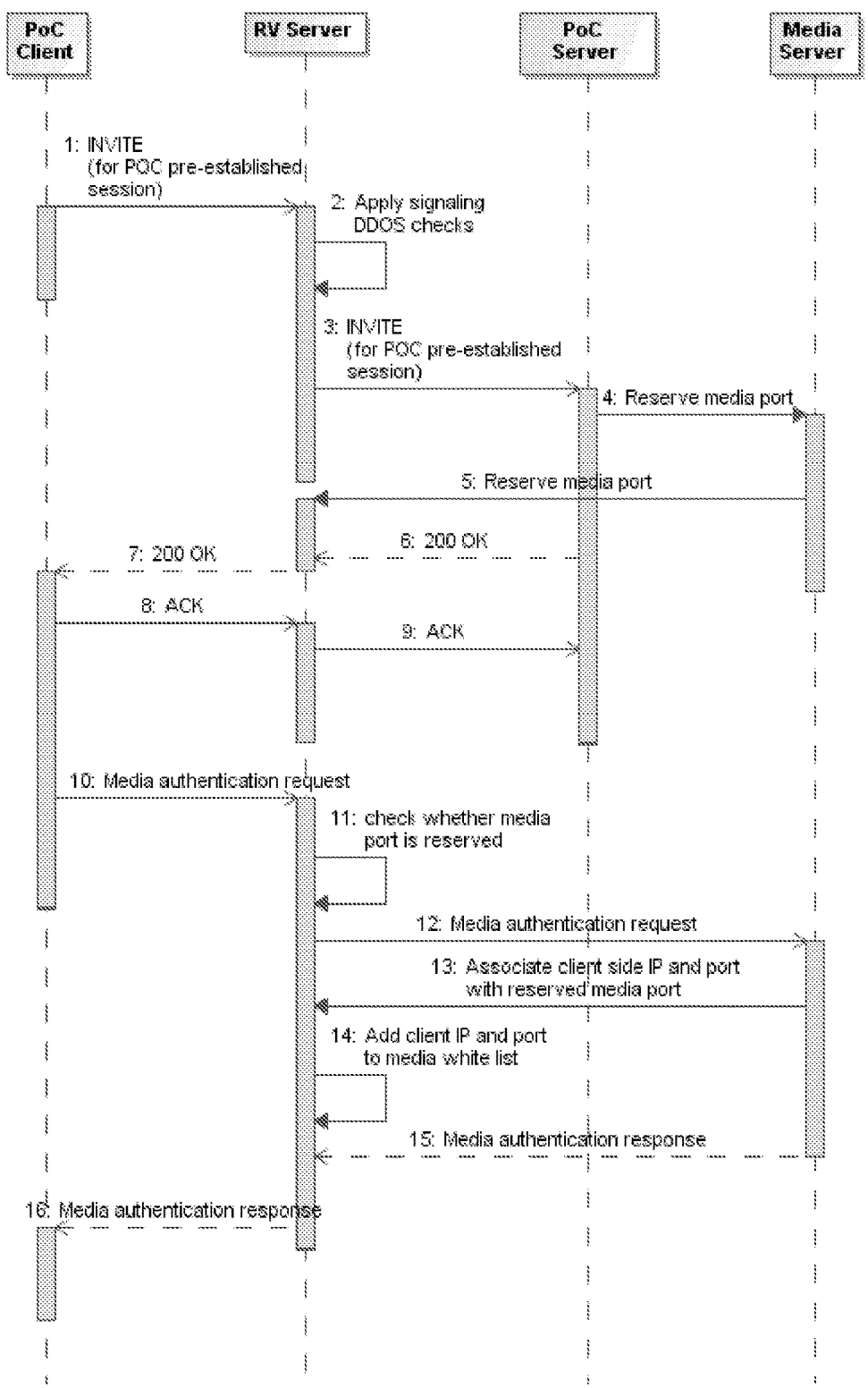
FIG. 6 illustrates a first method that involves restricting media traffic from valid PoC Clients, according to one embodiment of the present invention.

FIG. 6 illustrates a first method that involves restricting media traffic from valid PoC Clients 136. When a valid PoC Client 136 sets up a PoC pre-established session (steps 1, 2, 3), the Call Processing function of the PoC Server 112 instructs the Media Server 114 to reserve a media port (step 4) and the Media Server 114 in turn instructs the RV Server 140 to reserve a media port (step 5). (Steps 6, 7, 8 and 9 are responses and acknowledgments.) On receiving this Reserve Media Port instruction from the Media Server 114, the RV Server 140 reserves the specified IP:port address and inserts the reserved IP:port address of the RV Server 140 into the reserved media port list 508 and into the media DPI/ACL function 400. Each entry in the reserved media port list 508 has at least following information:

IP:port address (source IP, UDP or TCP port numbers) for RTP and RTCP traffic, and Expiry time (which will match the "expires" header returned).

The DPI/ACL function 400 allows for a media authentication message to be received (step 10) for some pre-configured limit (e.g., one time) from PoC Clients 136, so as to enable authentication by the Media Server 114. When a valid PoC client 136 completes the media authentication procedure successfully (steps 11 and 12), which includes the RV Server 140 adding the IP:port address of the PoC Client 136 to the media white-list 504 with the reserved media port list 508 (step 13), the Media Server 114 instructs the RV Server 140 to add the RTP and RTCP IP:port address of the PoC Client 136 to the media white-list 504 (step 14). (Steps 15 and 16 are responses.) The DPI/ACL function 400 allows media traffic only from IP:port addresses on the media white-list 504. In other words, traffic from any un-authenticated traffic sources 404 towards media interfaces of the RV Server 140 is blocked by the DPI/ACL function 400.

4.6 Restricting Media Traffic from Invalid Sources

A second method involves restricting media traffic from invalid sources by the media black-list 502 mechanism. The DPI/ACL function 400 inspects the media authentication response packets sent by the Media Server 114 to the PoC Client 136 for authentication failures. Upon detecting repeated authentication failures, the Media Server 114 adds the IP:port address of the source to the media black-list 502. Further, when several IP:port addresses belonging to the same IP address are added to media black-list 502 by the RV Server 140 within a short span of time, the RV Server 140 adds the entire IP address to the media black-list 502. Thereafter, all traffic received from the IP address or IP:port address that is present in media black-list 502 is blocked by the RV Server 140.

When the media packet completes the media white-list 504 comparison, the traffic source is accepted as a valid source and further media traffic is allowed from the source. However, the traffic generated by the sources in the media white-list 504 are subject to throttling and traffic shaping rules, which are used to control misbehaving PoC Clients 136 and/or to control compromised but valid PoC Clients 136 that could potentially be used for DoS attack on the servers.

4.7 Restricting Media Traffic from Valid PoC Clients not Engaged in a PoC Call

Figure 7:
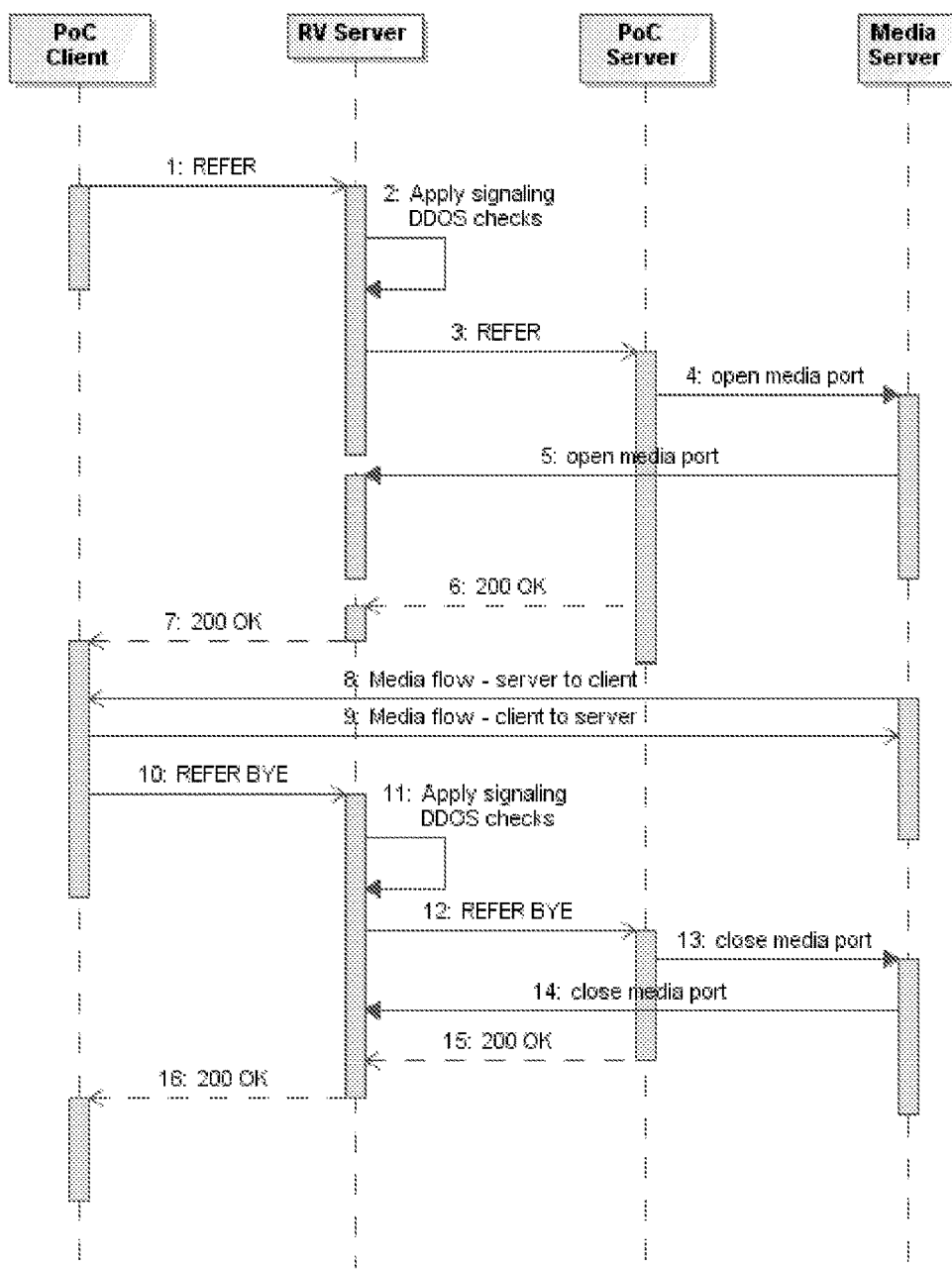
FIG. 7 illustrates a third method that involves restricting media traffic from valid PoC Clients when they are not actively engaged in a PoC call, according to one embodiment of the present invention.

FIG. 7 illustrates a third method that involves restricting media traffic from valid PoC Clients 136 when they are not actively engaged in a PoC call. Upon successful completion of the media session authentication by the PoC Client 136, as illustrated in FIG. 6, the Media Server 114 instructs the RV Server 140 to associate the RTP and RTCP IP:port address of the PoC Client 136 with a reserved media port of the RV Server 140. Further, when a registered PoC Client 136 initiates a PoC call, the RV Server 140 opens the previously reserved media port for the duration of the call, in order to allow the media traffic from the PoC Client 136 to pass through. This mechanism is illustrated in FIG. 7, wherein a valid PoC Client 136 initiates a PoC call by sending a REFER message to the PoC Server 112 (step 1), causing the Call Processing function to instruct the Media Server 114 to open the media port that has been previously reserved when the PoC Client 136 sets up the PoC pre-established session (steps 2, 3 and 4), as illustrated in FIG. 5. The Media Server 114, in turn, instructs the RV Server 140 to open the media port (step 5). Upon receiving this Open Media Port instruction from the Media Server 114, the RV Server 140 inserts the specified IP:port address of the RV Server 140 into the open media port list 510 and into the DPI/ACL function 400. Each entry in the open media port list 510 has at least following information:

IP:port address (source IP, UDP or TCP port numbers) for RTP and RTCP traffic, and Expiry time (which will match the "expires" header returned).

(Steps 6 and 7 are responses, and steps 8 and 9 are media flow, both server to client and client to server.)

Further, when the PoC call is ended by the PoC Client 136 by sending a REFER BYE (step 10), the Call Processing function of the PoC Server 112 instructs the Media Server 112 to close the media port (steps 11, 12 and 13), and the Media Server 114 relays the instruction to the RV Server 140 (step 14). Upon receiving this Close Media Port instruction from the Media Server 114, the RV Server 140 removes the specified IP:port from the open media port list 510. (Steps 15 and 16 are responses.)

The DPI/ACL function 400 on the RV Server 140 allows PoC Clients 136 using the IP:port address that has been added to media white-list 504 and that has been associated with reserved media port list 508 to transmit media traffic through the RV Server 140 to the Media Server 114 only when the reserved media port is also present in the open media port list 510. In other words, any media traffic even from a valid PoC Client 136 towards the media interfaces of the RV Server 140 is blocked by the DPI/ACL function 400 unless the PoC Client 136 is engaged in an active PoC call and uses the correct client IP:port and media server IP:port that are negotiated at the time of setting up PoC pre-established session and are refreshed and updated using the mechanisms defined in the PoC service.

Conclusion

In conclusion, the present invention relates to a system and method for providing advanced voice services in one or more wireless communications networks, and more specifically, to a method and framework to provide protection mechanisms from voice-over-IP (VoIP) denial-of-service (DoS) attacks. The system includes one or more servers that interface to the wireless communications networks to perform advanced voice services for one or more mobile units in the wireless communications networks, wherein the advanced voice services include an instant two-way half-duplex voice call within a group of the mobile units comprising a Push-to-Talk-over-Cellular (PoC) call session. Both the servers and the mobile units that use the advanced group services communicate with each other using control messages within the wireless communications networks, and at least one of the servers switches voice messages for the advanced group services between the mobile units across the wireless communications networks. At least one of the servers manages the PoC call session by acting as an arbitrator for the PoC call session and controls the sending of the control messages and the voice messages to and from the mobile units. Moreover, at least one of the servers interfaces to an Internet Protocol (IP) network to perform the advanced voice services for the mobile units in the IP network and includes a protection mechanism against the VoIP DoS attacks that may disrupt the system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communications services in a communications network comprising:

servers providing the communications services to mobile units in the communications network, the communications services including an instant two-way half-duplex voice call within a group of the mobile units comprising a Push-to-Talk-over-Cellular (PoC) call session;

wherein at least one of the servers interfaces to an Internet Protocol (IP) network to perform the communications services for the mobile units in the IP network and is configured to:

set up a pre-established session with a mobile unit of the mobile units by reserving a media port for receiving media traffic for the PoC call session from the mobile unit, the pre-established session being established for a media path between the mobile unit and the at least one of the servers prior to setup of a call for the PoC session;

authorize the mobile unit to temporarily communicate authentication messages with the at least one of the servers over the reserved media port in response to setting up the pre-established session, wherein the at least one of the servers is further configured to compare an incoming message to a black-list that identifies known bad addresses;
authenticate with the mobile unit in response to receiving the authentication messages from the mobile unit;
add the mobile unit to a white list in response to authenticating with the mobile unit; and
after adding the mobile unit to the white list, receiving the media traffic from the mobile unit over the reserved media port when the mobile unit is participating in the call for the PoC call session;
wherein the at least one of the servers responsible for handing the media traffic transmitted by the mobile unit reserves the reserved media port for the media traffic and authorizes the media traffic to flow through the reserved media port for a configured duration;
before the configured duration elapses, the at least one of the servers receives authentication credentials from the mobile unit via the reserved media port;
upon successful authentication of the mobile unit the IP address of the mobile unit is associated with the reserved media port, so that only the mobile unit is authorized to transmit media traffic to the at least one of the servers through the reserved media port; and
the IP address of the mobile unit is dis-associated with the reserved media port when a dialog between the at least one of the servers and the mobile unit is terminated by the at least one of the servers or the mobile unit.

2. The system of claim 1, wherein the servers interface to a Deep Packet Inspection/Access List Controller (DPI/ACL) function that restricts traffic to trusted and valid sources in the IP network.

3. The system of claim 1, wherein the at least one of the servers is further configured to:
identify the mobile units in the IP network that are known to be valid users of the system; and
add the mobile units that are known to be valid users to a white-list.

4. The system of claim 1, wherein any or all of the servers having knowledge of traffic patterns resulting from their functions detect suspect traffic patterns and make updates to the black-list with a source in the IP network of the suspect traffic patterns.

5. The system of claim 4, wherein the source of the suspect traffic patterns is added to the black-list in response to at least one of the servers sending the source of the suspect traffic patterns a configured number of authentication challenges within a configured time period.

6. The system of claim 1, wherein a source in the IP network receiving a configured number of authentication challenges within a configured time period from at least one of the servers is added to the black-list.

7. The system of claim 6, wherein the source resides on the black-list for a configured time period.

8. The system of claim 1, wherein the at least one of the servers is further configured to, on receiving a User Datagram Protocol (UDP) packet from a source in the IP network:
check whether the source's address is present in the black-list;
discard the UDP packet when the source's address is present in the black list;
access an entry for the source's address in a table with a value and setting a watch period when the source's address is not present in the black-list, wherein the value for the entry is incremented when the entry for the source's address already exists in the table; and
add the source's address to the black-list for the entry when the value exceeds a configured threshold within the watch period.

9. The system of claim 1, wherein the at least one of the servers is further configured to, prior to transmitting a response to a source in the IP network:
check whether the response is an authentication challenge;
access an entry for the source's address in a table with a value and setting a watch period when the response is an authentication challenge, wherein the value for the entry is incremented when the entry for the source's address already exists in the table;
add the source's address to the black-list when the value exceeds a configured threshold within the watch period; and
reset the value for the entry when the response is not an authentication challenge and the entry for the source's address already exists in the table.

10. The system of claim 1, wherein the at least one of the servers responsible for handing the media traffic transmitted by the mobile unit opens the reserved media port to let the media traffic pass through to the at least one of the servers, only when the mobile unit is engaged in the call for the PoC call session.

11. The system of claim 1, wherein the at least one of the servers opens the reserved media port when the at least one of the servers initiates the PoC call session towards the mobile unit.

12. The system of claim 1, wherein the at least one of the servers is further configured to:
determine whether an IP address of the mobile unit is on a white-list that identifies known good addresses;
verify the incoming message is a valid message in response to the IP address of the mobile unit being on the white-list; and
update the white-list according to whether authentication with the mobile unit succeeded.

13. The system of claim 12, wherein updating the white-list comprises updating the white-list to include the IP address of the mobile unit.

14. The system of claim 12, wherein the updating the white-list is performed by any or all of the servers having knowledge of traffic patterns resulting from their functions.

15. The system of claim 1, wherein the mobile unit uses a unique signature token in its messages, and the at least one of the servers is further configured to discard any messages purportedly from the mobile unit without the unique signature token.

16. A method, for providing communications services in a communications network, the method comprising:
by at least one server of a plurality of servers, wherein the at least one of the plurality of servers is configured to compare an incoming message to a black-list that identifies known bad addresses;
setting up a pre-established session with a mobile unit by reserving a media port for receiving media traffic for a Push-to-Talk-over-Cellular (PoC) call session from the mobile unit, the pre-established session being established for a media path between the mobile unit and the at least one of the plurality of servers prior to setup of a call for the PoC call session;
authorizing the mobile unit to temporarily communicate authentication messages with the at least one of the plurality of servers over the reserved media port in response to setting up the pre-established session;

authenticating with the mobile unit in response to receiving the authentication messages from the mobile unit;
adding the mobile unit to a white list in response to authenticating with the mobile unit; and
after adding the mobile unit to the white list, receiving the media traffic from the mobile unit over the reserved media port when the mobile unit is participating in the call for the PoC call session;
wherein the at least one of the plurality of servers responsible for handing the media traffic transmitted by the mobile unit reserves the reserved media port for the media traffic and authorizes the media traffic to flow through the reserved media port for a configured duration;
before the configured duration elapses, the at least one of the plurality of servers receives authentication credentials from the mobile unit via the reserved media port;
upon successful authentication of the mobile unit the IP address of the mobile unit is associated with the reserved media port, so that only the mobile unit is authorized to transmit media traffic to the at least one of the plurality of servers through the reserved media port; and
the IP address of the mobile unit is dis-associated with the reserved media port when a dialog between the at least one of the plurality of servers and the mobile unit is terminated by the at least one of the plurality of servers or the mobile unit.

17. The method of claim 16, further comprising:
receiving a request from the mobile unit to participate in the call for the PoC call session; and
opening the reserved media port such that the mobile unit is permitted to transmit the media traffic to at least one of the servers.

18. The method of claim 16, further comprising:
receiving keep-alive messages from the mobile unit over the reserved media port when the mobile unit is not participating in the call for the PoC call session.

19. The method of claim 18, further comprising:
closing the reserved media port for all traffic in response to one of receiving an instruction from the mobile unit to release the reserved media port, or failing to receive the keep-alive messages within a predetermined time period.

* * * * *